(12) United States Patent
Sandou et al.

(10) Patent No.: US 9,534,523 B2
(45) Date of Patent: Jan. 3, 2017

(54) ENGINE DEVICE FOR WORK VEHICLE

(71) Applicant: YANMAR CO., LTD., Osaka (JP)

(72) Inventors: Yoshiyuki Sandou, Osaka (JP); Tomoyuki Kimura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/776,201

(22) PCT Filed: Mar. 26, 2014

(86) PCT No.: PCT/JP2014/058430
§ 371 (c)(1),
(2) Date: Sep. 14, 2015

(87) PCT Pub. No.: WO2014/157285
PCT Pub. Date: Oct. 2, 2014

(65) Prior Publication Data
US 2016/0040568 A1 Feb. 11, 2016

(30) Foreign Application Priority Data
Mar. 28, 2013 (JP) ................. 2013-069408

(51) Int. Cl.
B60K 13/04 (2006.01)
F01N 3/021 (2006.01)
F01N 3/20 (2006.01)
F01N 13/18 (2010.01)
F01N 13/00 (2010.01)
(Continued)

(52) U.S. Cl.
CPC ................. *F01N 3/021* (2013.01); *B60K 5/12* (2013.01); *B60K 13/04* (2013.01); *E02F 9/0866* (2013.01); *F01N 3/2066* (2013.01); *F01N 13/009* (2014.06); *F01N 13/0097* (2014.06); *F01N 13/1822* (2013.01); *F01N 2340/04* (2013.01); *F01N 2590/08* (2013.01); *Y02T 10/24* (2013.01)

(58) Field of Classification Search
CPC ........ Y02T 10/24; B60K 13/04; B60K 15/063
See application file for complete search history.

(56) References Cited

U.S. PATENT DOCUMENTS

| 7,717,205 B2* | 5/2010 | Kertz ..................... B60K 13/04 180/68.1 |
| 2010/0192551 A1* | 8/2010 | Yokota ................. B60K 15/063 60/295 |
| 2011/0283687 A1 | 11/2011 | Dobler et al. |

(Continued)

FOREIGN PATENT DOCUMENTS

| GB | 2465151 A | 5/2010 |
| JP | 2007-40224 A | 2/2007 |

(Continued)

*Primary Examiner* — Bryan Evans
(74) *Attorney, Agent, or Firm* — Norris McLaughlin & Marcus, P.A.

(57) ABSTRACT

An engine device for a work vehicle is configured to include a first case that removes particulate matter in exhaust gas of an engine and a second case that removes nitrogen oxides in the exhaust gas of the engine and configured to mount the engine on a travelling vehicle-body frame on which right and left running wheels are arranged, and the engine device has structure in which the first case is supported on the engine, and the second case is mounted on the travelling vehicle-body frame via support bodies.

4 Claims, 14 Drawing Sheets

(51) Int. Cl.
*E02F 9/08* (2006.01)
*B60K 5/12* (2006.01)

(56) References Cited

U.S. PATENT DOCUMENTS

| | | |
|---|---|---|
| 2012/0042637 A1 | 2/2012 | Roozenboom et al. |
| 2012/0217082 A1 | 8/2012 | Kleinhenz et al. |
| 2013/0343853 A1 | 12/2013 | Sato et al. |

FOREIGN PATENT DOCUMENTS

| | | |
|---|---|---|
| JP | 2009-074420 | 4/2009 |
| JP | 2010-022244 A | 2/2010 |
| JP | 2010-063417 A | 3/2010 |
| JP | 2012-021505 | 2/2012 |
| JP | 2012-126209 | 7/2012 |
| JP | 2012-177233 | 9/2012 |
| JP | 2012-219624 | 11/2012 |
| JP | 2012-219624 A | 11/2012 |
| WO | 2011/015458 A1 | 2/2011 |
| WO | WO-2011/129030 | 10/2011 |
| WO | WO-2011/152306 | 12/2011 |
| WO | 2012/114783 A1 | 8/2012 |
| WO | 2012/117753 A1 | 9/2012 |
| WO | WO-13/003716 | 1/2013 |

\* cited by examiner

ENGINE DEVICE FOR WORK VEHICLE

TECHNICAL FIELD

The present invention of the instant application relates to an engine device such a diesel engine mounted on an agricultural machine (a tractor and a combine harvester) or a construction machine (a bulldozer, a hydraulic excavator, and a loader), and more specifically relates to an engine device for work vehicles, in which an exhaust gas purification device is mounted that removes particulate matter (soot and particulates) included in exhaust gas or nitrogen oxides (NOx) included in the exhaust gas, and the like.

BACKGROUND OF THE INVENTION

Regarding work vehicles such as a tractor and a wheel loader, an opening/closing fulcrum shaft is arranged in the rear portion of a hood for covering an engine, and the hood is rotated about the opening/closing fulcrum shaft, for the purpose of improving the efficiency of maintenance work for the engine arranged in the front of a travelling vehicle body. Also, a technology of purification treatment has been known theretofore, in which a case (hereinafter referred to as "DPF case") in which a diesel particulate filter is internally provided, and a case (hereinafter referred to as "SCR case") in which a urea selective reduction catalyst is internally provided are provided in the exhaust path of a diesel engine as an exhaust gas purification device (exhaust gas after-treatment device), and the exhaust gas is introduced into the DPF case and the SCR case, thereby purifying the exhaust gas discharged from the diesel engine (for example, see Patent Literatures 1 to 3).

CITATION LIST

PTL 1: Japanese Unexamined Patent Application Publication No. 2009-74420
PTL 2: Japanese Unexamined Patent Application Publication No. 2012-21505
PTL 3: Japanese Unexamined Patent Application Publication No. 2012-177233

SUMMARY OF THE INVENTION

When the DPF case and the SCR case are assembled apart from the engine, as disclosed in Patent Literature 1 or 2, the temperature of the exhaust gas supplied from the engine to the DPF case or the SCR case is reduced, and the reproduction of the diesel particulate filter or chemical reaction such as the action of selective catalyst reduction is defectively made, and the efficiency of purifying the nitrogen oxides is deteriorated, which leads to a problem that a specific device for maintaining the exhaust gas at a high temperature in the SCR case needs to be provided.

On the other hand, as disclosed in Patent Literature 3, when the DPF case and the SCR case are assembled in the engine, the reduction of the temperature of the exhaust gas supplied from the engine to the SCR case is decreased, and the temperature of the exhaust gas in the SCR case is easily maintained at a high temperature, but it is necessary to secure an installation space for the DPF case and the SCR case in an engine room, which leads to problems in that it is difficult to constitute a miniaturized engine room, and the DPF case, the SCR case, or the like cannot be easily supported. Also, there is a problem in that the assembly workability or the maintenance workability regarding the DPF case, the SCR case, and the like cannot be improved in the engine room where space is limited.

Accordingly, it is an object of the present invention of the instant application to provide an engine device for work vehicles, in which improvements are provided in the light of the current circumstances.

In order to achieve the aforementioned object, an engine device for a work vehicle may include a first case that removes particulate matter in exhaust gas of an engine and a second case that removes nitrogen oxides in the exhaust gas of the engine, and configured to mount the engine on a travelling vehicle-body frame on which right and left running wheels are arranged, and the engine device may has structure in which the first case is supported on any of the engine or the travelling vehicle-body frame, and the second case is mounted on the travelling vehicle-body frame via support bodies.

With respect to the engine device for a work vehicle, the present invention may be such that the second case is mounted in a longitudinal posture on the travelling vehicle-body frame on one side of a rear portion of the engine via the support bodies.

With respect to the engine device for a work vehicle, the present invention may be such that the second case is mounted in a lateral posture on the travelling vehicle-body frame on one side of a rear portion of the engine via the support bodies.

With respect to the engine device for a work vehicle, the present invention may be such that the work vehicle is such that an operation section that an operator gets on is arranged in a rear of a hood in which the engine is internally disposed, and a urea water tank for exhaust gas purification is installed between a fuel tank provided at a lower portion of the operation section and the engine, and the second case is arranged on one side of a rear portion of the engine, and the urea water tank is arranged on the other side of the rear portion of the engine.

According to the present invention, the engine device for a work vehicle includes the first case that removes the particulate matter in exhaust gas of the engine and the second case that removes the nitrogen oxides in the exhaust gas of the engine, and configured to mount the engine on the travelling vehicle-body frame on which the right and left running wheels are arranged, and the engine device has the structure in which the first case is supported on any of the engine or the travelling vehicle-body frame, and the second case is mounted on the travelling vehicle-body frame via the support bodies, so that the second case can be easily supported on the travelling vehicle-body frame, and the assembly workability or maintenance workability of each case, whose external shape is formed in an oblong cylindrical shape, can be improved. Also, the exhaust gas outlet of the first case and the exhaust gas inlet of the second case can be separated from each other at an interval required for mixing the urea, and the generation of ammonia in the exhaust gas leading to the second case can be facilitated.

According to the present invention, the second case is mounted in a longitudinal posture on the travelling vehicle-body frame on one side of the rear portion of the engine via the support bodies, so that the second case whose external shape is formed an oblong, cylindrical shape can be installed in a limited space in the vicinity of the rear portion of the engine (in the vicinity of the joint corner of the operation section and the hood). For example, even with the structure in which the front wheels need to be visually ensured, and therefore the right-and-left width of the hood is limited, an operator's field of vision in front of the operation section can be easily secured.

According to the present invention the second case is mounted in a lateral posture on the travelling vehicle-body frame on one side of the rear portion of the engine via the support bodies, so that the second case whose external shape is formed in the oblong cylindrical shape can be installed in a limited space at a lower position of the rear portion of the engine. For example, even with the structure in which the front wheels need to be visually ensured, and therefore the right-and-left width of the hood is limited, the second case can be easily arranged at a lower position of the front surface side of the operation section, with respect to the outer right side of the rear portion of the hood in which the engine is internally disposed, and an operator's field of vision in front of the operation section can be easily secured.

According to the present invention, the work vehicle is such that an operation section that an operator gets on is arranged in a rear of a hood in which the engine is internally disposed, and a urea water tank for exhaust gas purification is installed between a fuel tank provided at a lower portion of the operation section and the engine, and the second case is arranged on one side of a rear portion of the engine, and the urea water tank is arranged on the other side of the rear portion of the engine, so that the oil-supplying port of the fuel tank and the water-supplying port of the urea water tank can be adjacently arranged, and the fuel-supplying operation and the water-supplying operation of the urea aqueous solution can be carried out at the same work area, and the workability of replenishing the fuel for the engine or the urea aqueous solution for the exhaust gas purification can be improved, while the bilateral sides (the lower portion on the front side of the operation section) of the rear portion of the engine can be effectively used as the installation space of the second case and the urea water tank. In addition, the urea water tank can be heated by the exhaust heat of the engine and the fuel tank, and the aqueous solution having a predetermined temperature or higher can be maintained in the urea water tank, and the reduction in the capacity of the exhaust gas purification of the second case can be prevented in cold districts and the like.

DESCRIPTION OF THE PREFERRED EMBODIMENTS

Figure 1:
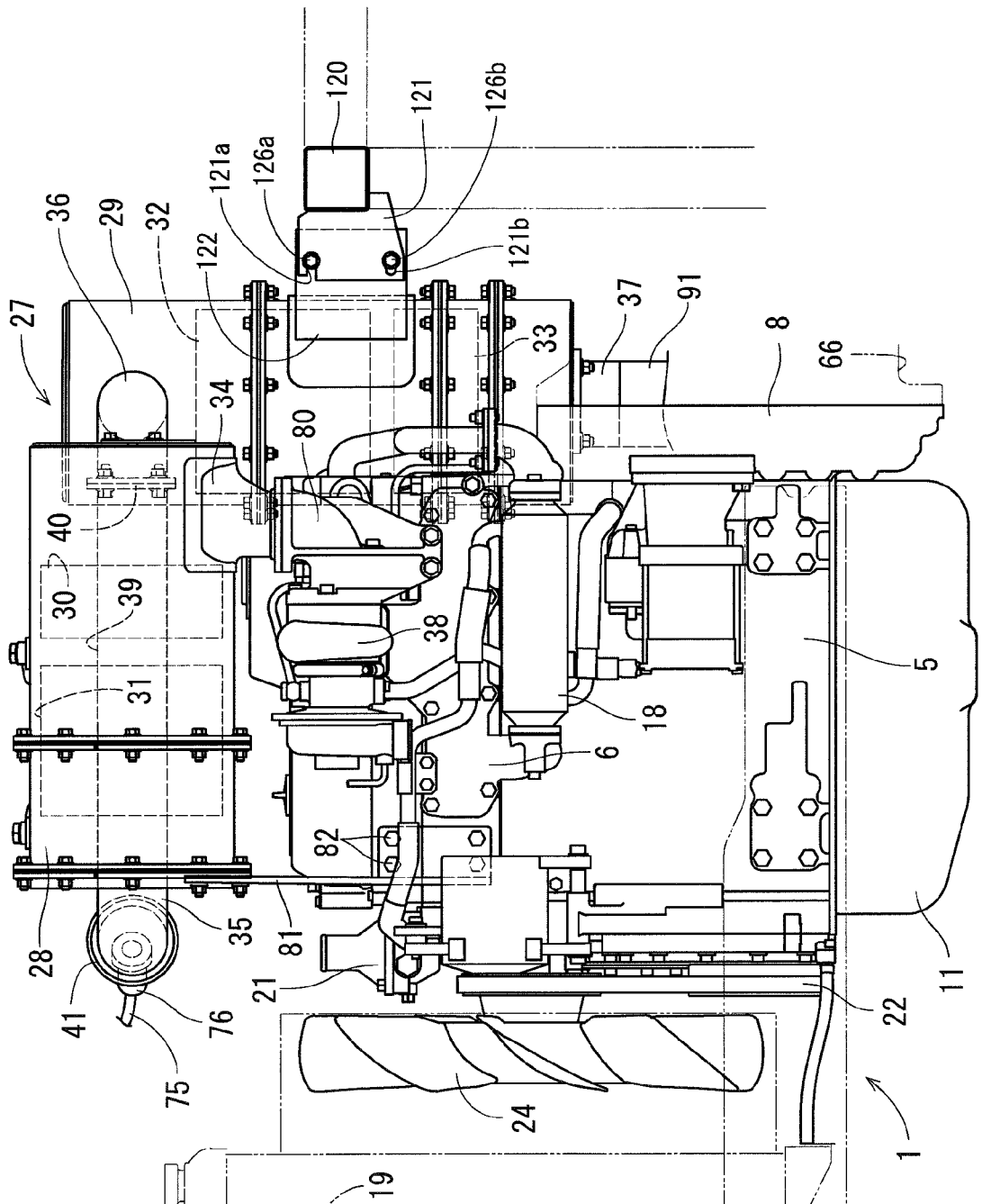
FIG. 1 is a left side view of a diesel engine, which illustrates a first embodiment.
Figure 2:
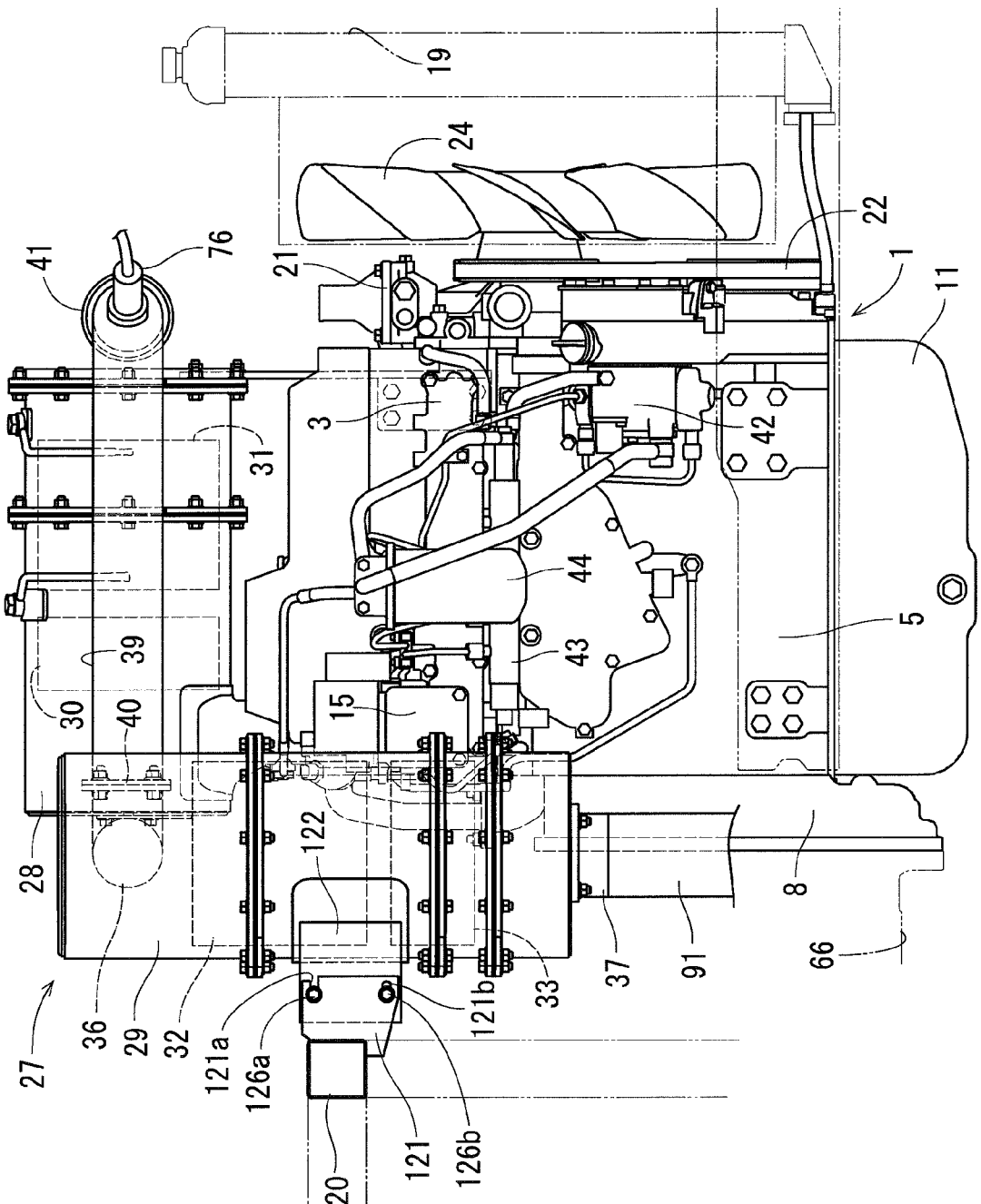
FIG. 2 is a right side view of the diesel engine.
Figure 3:
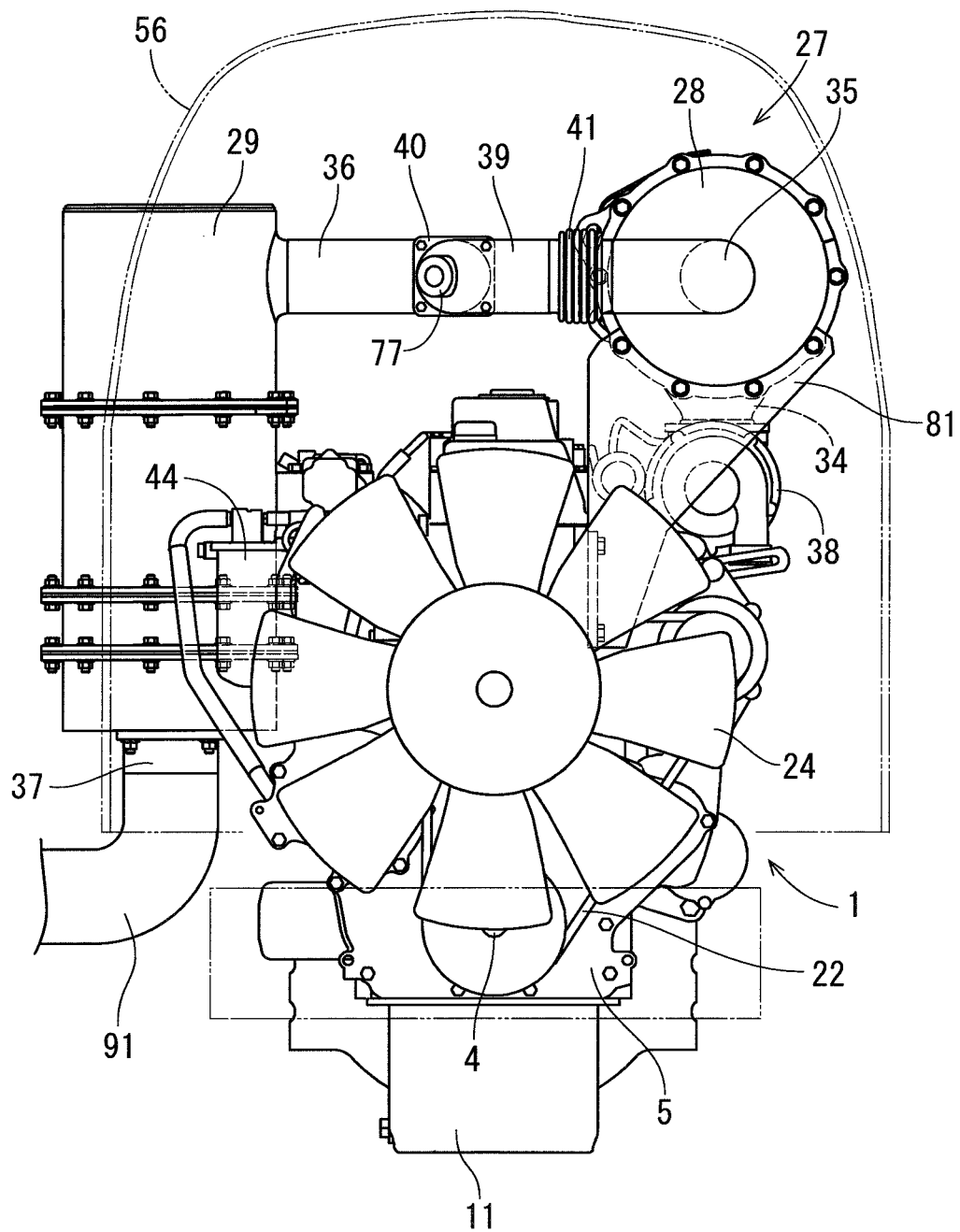
FIG. 3 is a front view of the diesel engine.

Hereinafter, a first embodiment, in which the present invention is exemplified, will be described based on drawings (FIGS. 1 to 11). FIG. 1 is a left side view of a diesel engine in which an exhaust manifold is installed, and FIG. 2 is a right side view of the diesel engine in which an intake manifold is installed, and FIG. 3 is a front view of the diesel engine in which a cooling fan is installed. The entire structure of a diesel engine 1 will be described referring to FIGS. 1 to 3.

As illustrated in FIGS. 1 to 3, an intake manifold 3 is arranged on one side of a cylinder head 2 of the diesel engine 1. The cylinder head 2 is mounted on a cylinder block 5 in which an engine output shaft 4 (crankshaft) and pistons (not illustrated) are incorporated. An exhaust manifold 6 is arranged on the other side of the cylinder head 2. The front end and the rear end of the engine output shaft 4 protrude from the front surface and the rear surface of the cylinder block 5.

As illustrated in FIGS. 1 to 3, a flywheel housing 8 is firmly fixed to the rear surface of the cylinder block 5. A flywheel (not illustrated) is provided in the flywheel housing 8. The flywheel is pivotably supported on the rear end side of the engine output shaft 4. It is configured such that the motive power of the diesel engine 1 is taken out via the flywheel. Furthermore, an oil pan 11 is arranged on the lower surface of the cylinder block 5.

Figure 4:
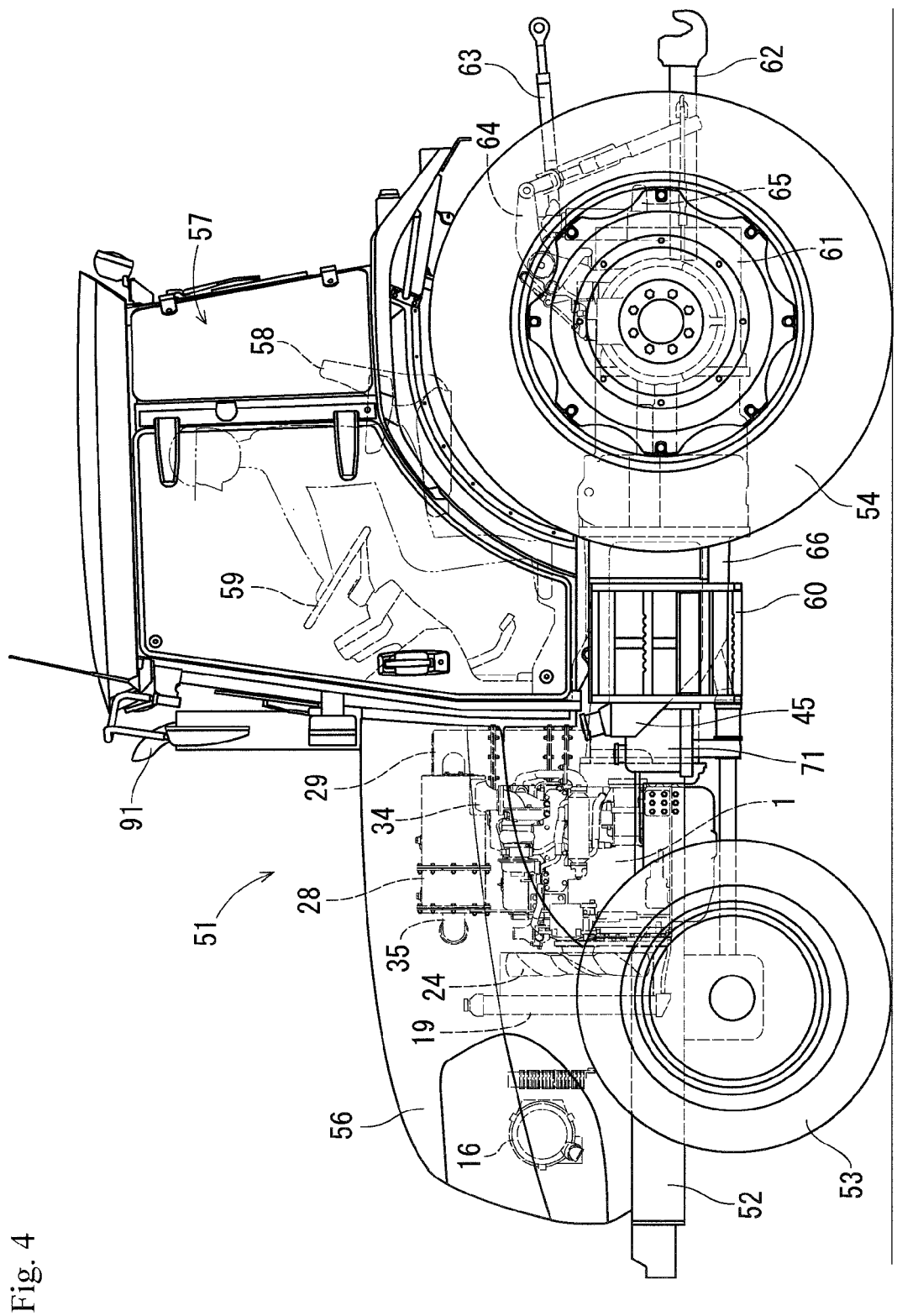
FIG. 4 is a left side view of a tractor in which the diesel engine is mounted.

As illustrated in FIGS. 1 and 3, an exhaust gas recirculation device (EGR) 15 that takes in the exhaust gas for recirculation is arranged on the intake manifold 3. An air cleaner 16 illustrated in FIG. 4 is connected to the intake manifold 3. It is configured such that outside air that is purified by removing dust by means of the air cleaner 16 is delivered to the intake manifold 3 and supplied to each cylinder of the diesel engine 1.

With the aforementioned constitution, part of the exhaust gas discharged from the diesel engine 1 to the exhaust manifold 6 is recirculated from the intake manifold 3 into each cylinder of the diesel engine 1 via the exhaust gas recirculation device 15, thereby reducing the combustion temperature of the diesel engine 1, reducing the emissions of nitrogen oxides (NOx) from the diesel engine 1, and improving the fuel consumption of the diesel engine 1.

It is noted that a coolant pump 21 for circulating a coolant to the cylinder block 5 and a radiator 19 illustrated in FIG. 4 is provided. The coolant pump 21 is arranged on the installation side of a cooling fan 24 of the diesel engine 1. The coolant pump 21 and the cooling fan 24 are coupled with the engine output shaft 4 via a V belt 22 and the like, thereby driving the coolant pump 21 and the cooling fan 24. It is configured such that the coolant is delivered from the coolant pump 21 into the cylinder block 5 via an EGR cooler 18 of the exhaust gas recirculation device 15, while the diesel engine 1 is cooled by the wind of the cooling fan 24.

As illustrated in FIGS. 1 to 3, the diesel engine 1 includes a first case 28 as a diesel particulate filter (DPF) that removes particulate matter in the exhaust gas of the diesel engine 1 and a second case 29 as a urea selective catalyst reduction (SCR) system that removes the nitrogen oxides in the exhaust gas of the diesel engine 1, as an exhaust gas purification device 27 for purifying the exhaust gas discharged from each cylinder of the diesel engine 1. As illustrated in FIGS. 1 and 2, an oxidation catalyst 30 and a soot filter 31 are internally provided in the first case 28. An SCR catalyst 32 and an oxidation catalyst 33 for urea selective catalyst reduction are internally provided in the second case 29.

The exhaust gas discharged from each cylinder of the diesel engine 1 to the exhaust manifold 6 is released to the outside via the exhaust gas purification device 27 and the like. It is configured such that carbon monoxide (CO), hydrocarbon (HC), particulate matter (PM), and nitrogen oxides (NOx) in the exhaust gas of the diesel engine 1 are reduced by means of the exhaust gas purification device 27.

The first case 28 is constituted in a lateral, oblong cylindrical shape elongated in the direction parallel to the output shaft (crankshaft) 4 of the diesel engine 1 when viewed from a plane. A DPF inlet pipe 34 that takes in the exhaust gas and a DPF outlet pipe 35 that discharges the exhaust gas are provided on the cylindrical bilateral sides (one end side and the other end side of the transfer direction of the exhaust gas) of the first case 28. In contrast, the second case 29 is constituted in a longitudinal, oblong cylindrical shape elongated in the up-and-down direction. An SCR inlet pipe 36 that takes in the exhaust gas and an SCR outlet pipe 37 that discharges the exhaust gas are provided on the bilateral sides (one end side and the other end side of the transfer direction of the exhaust gas) of the second case 29.

Also, a supercharger 38 that forcibly feeds air into the diesel engine 1 is arranged at the exhaust gas outlet of the exhaust manifold 6. It is configured such that the DPF inlet pipe 34 communicates with the exhaust manifold 6 via the supercharger 38, and the exhaust gas of the diesel engine 1 is introduced into the first case 28, while the SCR inlet pipe 36 is connected to the DPF outlet pipe 35 via a urea mixing pipe 39, and the exhaust gas of the first case 28 is introduced into the second case 29. In addition, the DPF outlet pipe 35 and the urea mixing pipe 39 are connected to a corrugated coupling pipe 41 that is bendable, extendable, and contractible. It is noted that the SCR inlet pipe 36 and the urea mixing pipe 39 are firmly fixed to a pipe bracket 40 in a detachable manner.

As illustrated in FIG. 2, a fuel pump 42 and a common rail 43 that are connected to a fuel tank 45 illustrated in FIG. 4 are provided in respective injectors (not illustrated) corresponding to the multi cylinders of the diesel engine 1. The common rail 43 and a fuel filter 44 are arranged on the installation side of the intake manifold 3 of the cylinder head 2, and the fuel pump 42 is arranged in the cylinder block 5 below the intake manifold 3. It is noted that each injector includes a fuel injection valve (not illustrated) of an electromagnetic opening/closing control type.

The fuel in the fuel tank 45 is drawn in by the fuel pump 42 via the fuel filter 44, while the common rail 43 is connected to the discharge side of the fuel pump 42, and the cylindrical common rail 43 is connected to each injector of the diesel engine 1. It is noted that surplus fuel, out of the fuel that is pressure-fed from the fuel pump 42 to the common rail 43, is returned to the fuel tank 45, and the high-pressure fuel is temporarily retained in the common rail 43, and the high-pressure fuel in the common rail 43 is supplied into the interior of each cylinder of the diesel engine 1.

With the aforementioned constitution, the fuel in the fuel tank 45 is pressured-fed to the common rail 43 by means of the fuel pump 42, and the high-pressure fuel in the common rail 43 is stored, and the fuel injection valves of the injectors are controlled in an openable/closable manner, thereby injecting the high-pressure fuel in the common rail 43 into each cylinder of the diesel engine 1. That is, the fuel injection valve of each injector is electronically controlled, so that the injection pressure, injection time, and injection period (injection amount) of the fuel can be controlled with high accuracy. Accordingly, the nitride oxides (NOx) discharged from the diesel engine 1 can be reduced.

Figure 5:
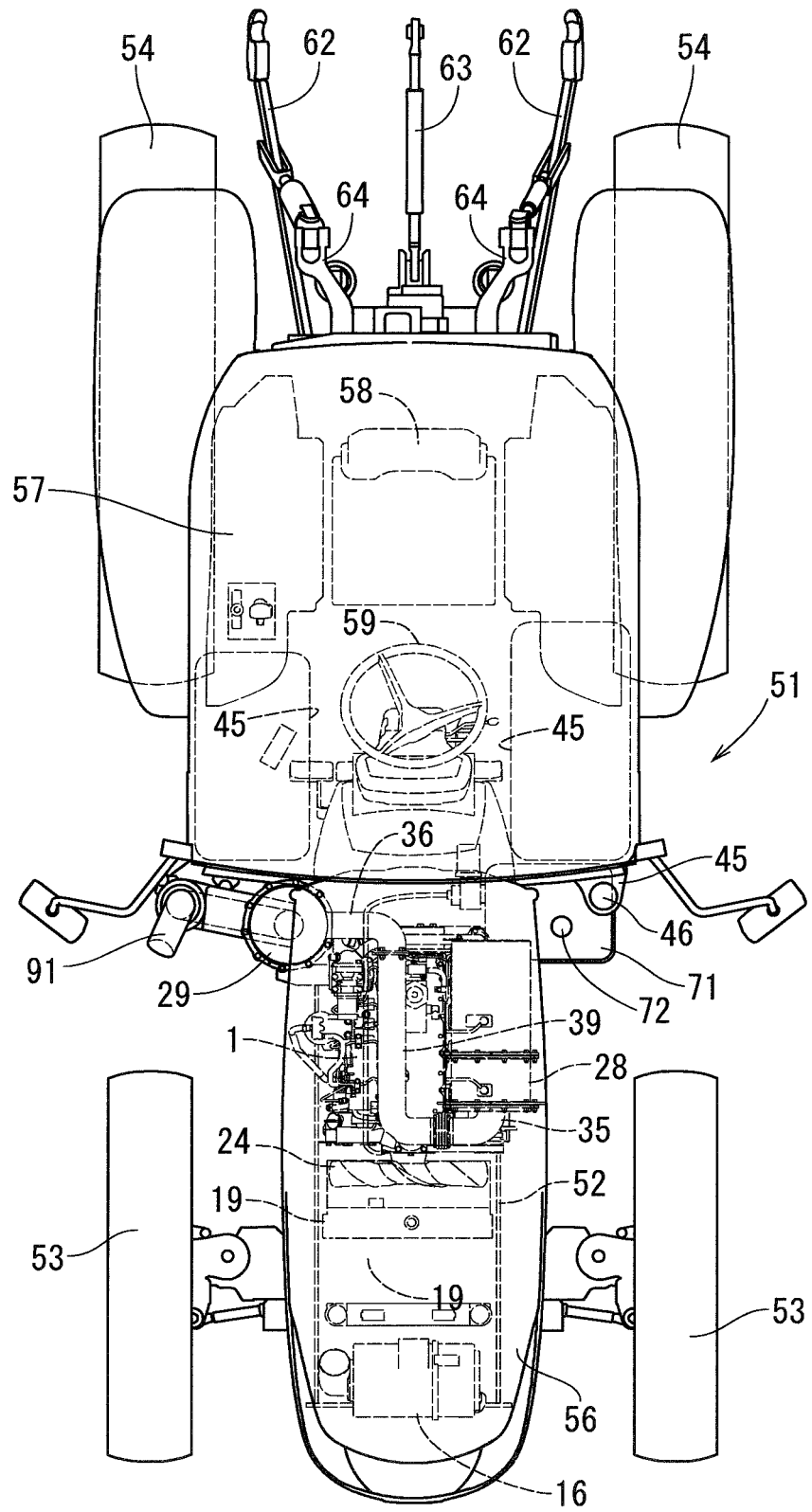
FIG. 5 is a plan view of the tractor.
Figure 6:
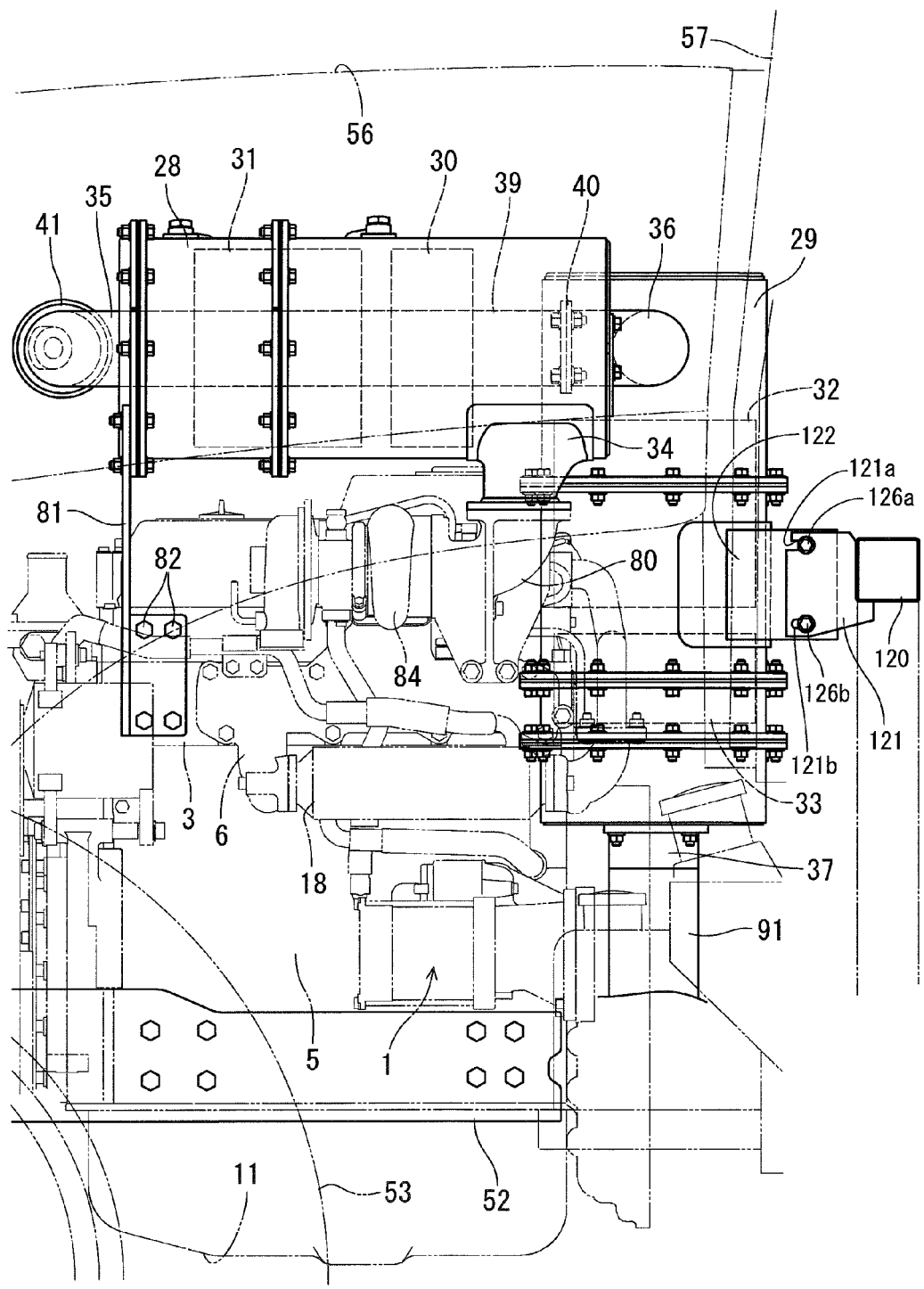
FIG. 6 is a left side view of an exhaust gas purification device.
Figure 7:
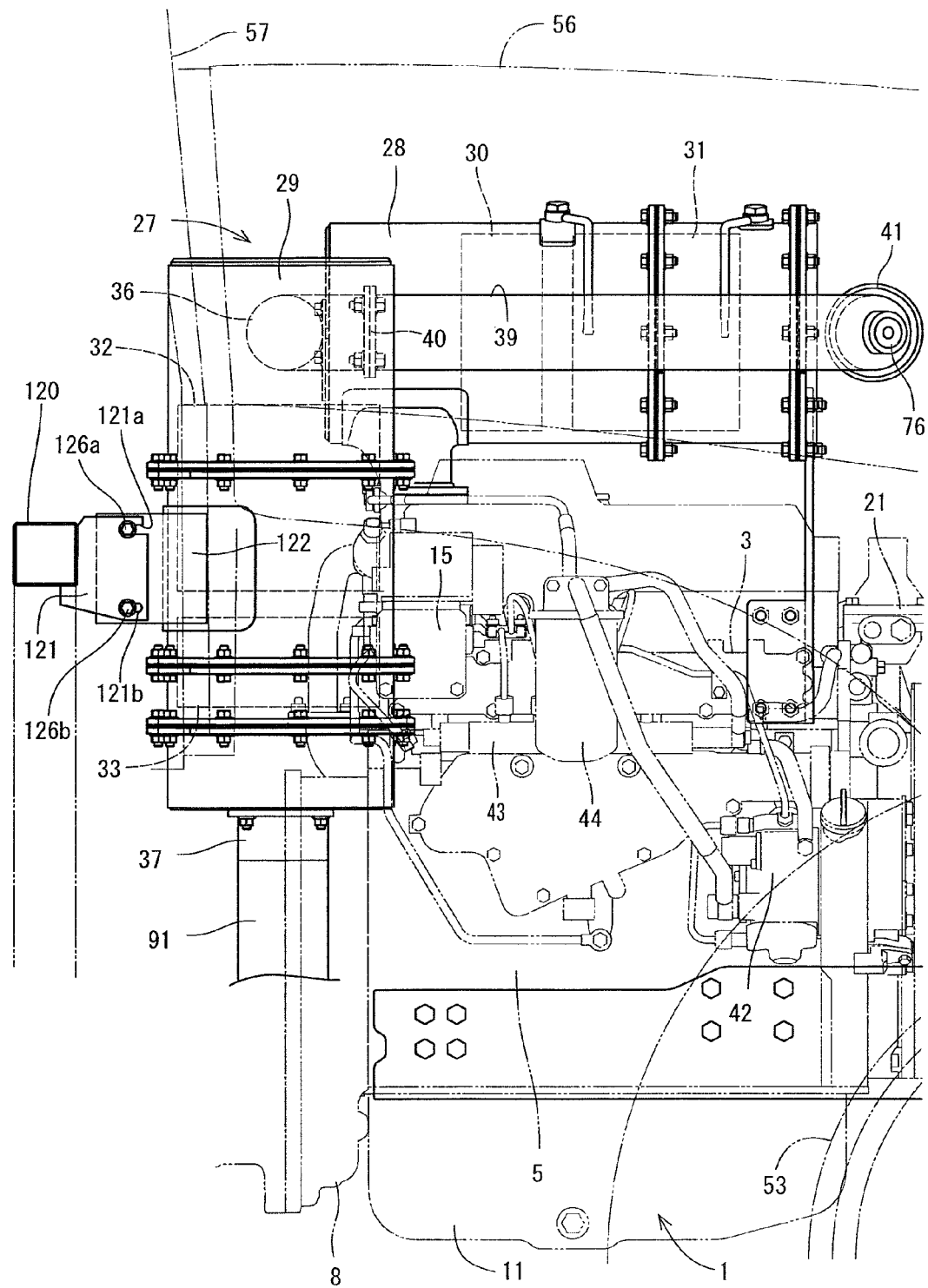
FIG. 7 is a right side view of the exhaust gas purification device.
Figure 8:
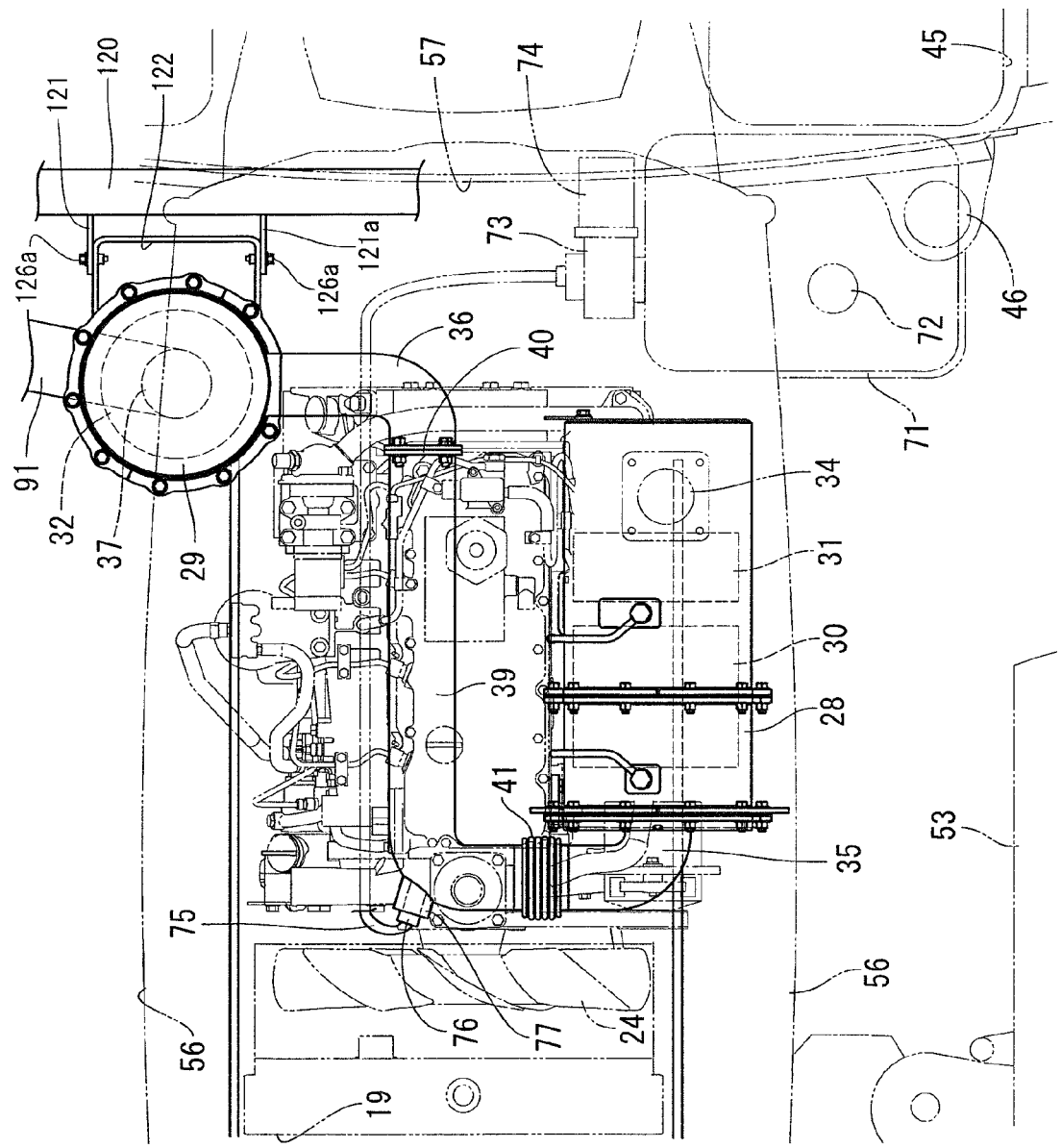
FIG. 8 is a plan view of the exhaust gas purification device.
Figure 9:
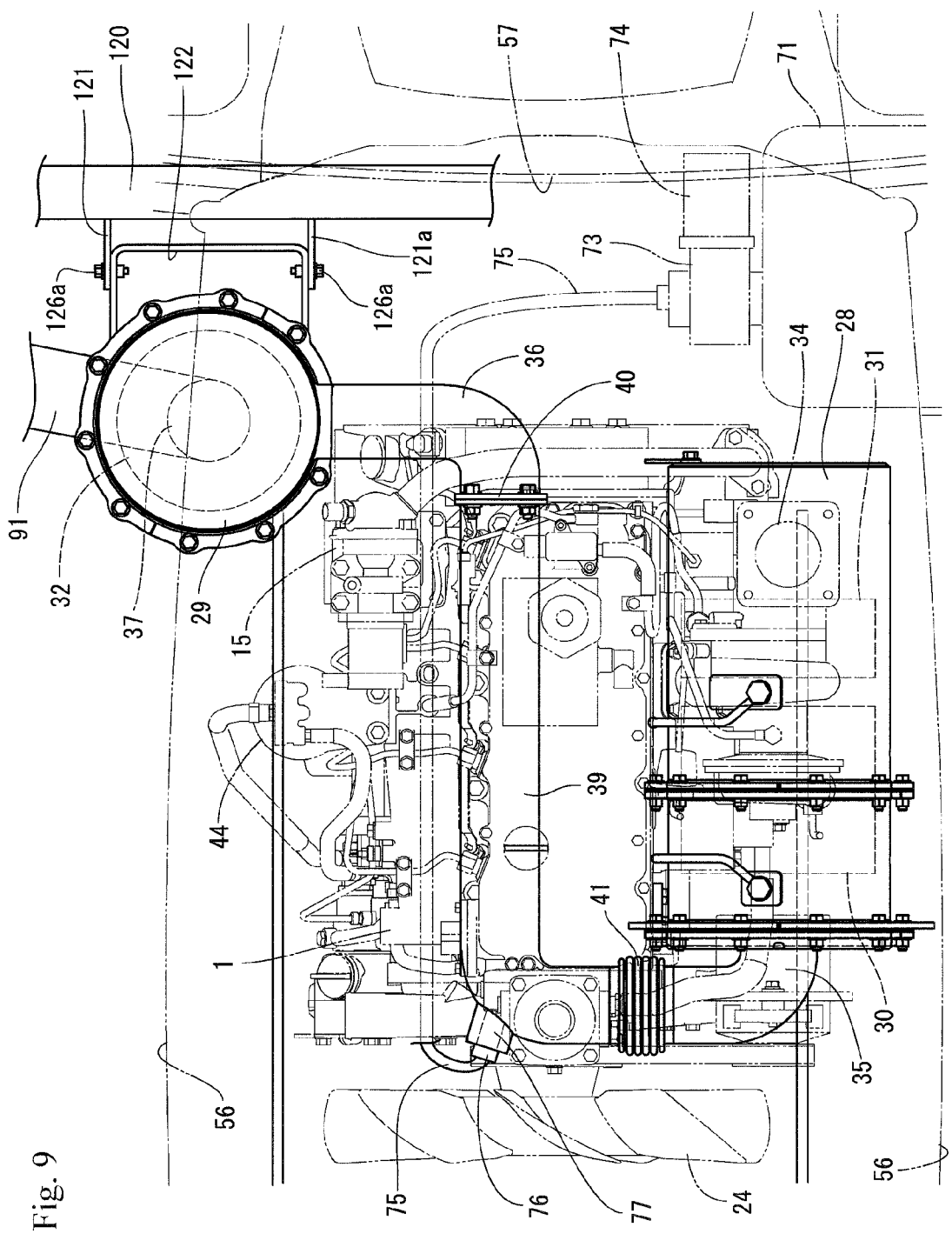
FIG. 9 is an enlarged explanatory view of FIG. 8.

Next, a tractor 51 on which the diesel engine 1 is mounted will be described referring to FIGS. 4 to 9. The tractor 51 as a work vehicle illustrated in FIGS. 4 to 9 is configured to be equipped with a tilling machine not illustrated and perform tillage in a way to till farm fields. FIG. 4 is a side view of a tractor for farm work, and FIG. 5 is a plan view of the tractor, and FIG. 6 is a left side view of an engine section, and FIG. 7 is a right side view of the engine section, and FIG. 8 is a flat view of the engine section, and FIG. 9 is an enlarged flat view of FIG. 8. It is noted that, in the description below, a left side with respect to the advance direction of the tractor is merely referred to as "left side", and a right side with respect to the advance direction of the tractor is merely referred to as "right side".

As illustrated in FIGS. 4 and 5, the tractor 51 for farm work as a work vehicle is configured such that a travelling vehicle body 52 is supported by a pair of right and left front wheels 53 and a pair of right and left rear wheels 54, and the diesel engine 1 is mounted on the front portion of the travelling vehicle body 52, and the front wheels 53 and the rear wheels 54 are driven by the diesel engine 1, which allows the tractor 51 to travel forward and backward. The upper surface side and the right and left lateral surface sides of the diesel engine 1 are covered by an openable/closable hood 56.

Also, an operation cabin 57 as an operation section that an operator rides on is installed in the rear of the hood 56 on the upper surface of the travelling vehicle body 52. A maneuvering seat 58 that the operator takes, and maneuvering instruments such as a maneuvering handle 59 as a steering means are provided in the interior of the cabin 57. Also, a pair of right and left steps 60 that the operator ascends or descends are provided on the right and left external lateral sections of the cabin 57, and the fuel tank 45 for supplying the fuel to the diesel engine 1 is provided on the inner side of the steps 60 and on the lower side with respect to the bottom portion of the cabin 57.

Also, the travelling vehicle body 52 includes a mission case 61 for shifting gears based on the output from the diesel engine 1 and transmitting the output to the rear wheels 54 (front wheels 53). The tilling machine not illustrated or the like is coupled with the rear portion of the mission case 61 in such a manner as to be capable of being hoisted and lowered via a lower link 62, a top link 63, a lift arm 64, and the like. Furthermore, a PTO shaft 65 for driving the tilling machine and the like is provided on the rear lateral surface of the mission case 61. It is noted that the travelling vehicle body 52 of the tractor 5 is constituted by the diesel engine 1, the mission case 61, and a clutch case 66 that couples the diesel engine 1 with the mission case 61.

Furthermore, as illustrated in FIGS. 4 to 7, the DPF inlet pipe 34 is fastened with bolts to an exhaust gas outlet pipe 80 of the supercharger 38 in a detachable manner. Also, with respect to the external circumferential surface of the first case 28, the upper end side of a DPF support leg body 81 is fastened and fixed on the outer circumferential surface of the end portion on the side of the DPF outlet pipe 35, and the lower end side of the DPF support leg body 81 is fastened with bolts 82 to the lateral surface of the cylinder head 2 or the upper surface of the exhaust manifold 6 in a detachable manner. That is, the first case 28 is mounted on the upper surface side of the diesel engine 1 via the exhaust gas outlet pipe 80 and the DPF support leg body 81. The longitudinal direction of the cylindrical first case 28 is oriented in the front-and-back direction of the diesel engine 1, and the first case 28 is supported parallel to the exhaust manifold 6.

As illustrated in FIGS. 1, 2, and 6 to 9, the second case 29 is supported by a travelling vehicle-body frame 120 constituting the cabin 57. A pair of right and left purification case support bodies 121 is integrally welded and fixed on the travelling vehicle-body frame 120, and the pair of right and left purification case support bodies 121 is projectingly disposed from the travelling vehicle-body frame 120 to the front. With respect to the outer circumferential surface of the second case 29 for purifying the exhaust gas, a back support bracket 122 is integrally welded and fixed on the back surface side of the second case 29, and the back support bracket 122 is projectingly disposed from the midway portion of the vertical width of the second case 29 to the rear. The back support bracket 122 is fitted between the pair of right and left purification case support bodies 121, and the back support bracket 122 is fastened to the purification case support bodies 121 in a detachable manner by means of an upper bolt 126*a* and a lower bolt 126*b* that are operated and threadedly engaged with the right and left lateral surfaces of the pair of right and left purification case support bodies 121 and the back support bracket 122, from the right-and-left direction.

As illustrated in FIGS. 7 and 9, the upper bolt 126*a* is locked with a locking notch 121*a* of the purification case support body 121 in a disengageable manner, and the lower bolt 126*b* penetrates the position-adjustment long hole 121*b* of the purification case support body 121. That is, when the second case 29 is assembled, the upper bolt 126*a* is temporarily fastened to the back support bracket 122, and the second case 29 is disposed in close proximity of a mounting position of the purification case support body 121, and the upper bolt 126*a* is engaged with the locking notch 121*a* of the purification case support body 121, and the second case 29 is temporarily supported by the purification case support body 121. Subsequently, it is configured such that the lower bolt 126*b* penetrates the position-adjustment long hole 121*b* of the purification case support body 121, and the lower bolt 126*b* is fastened to the back support bracket 122, and the upper bolt 126*a* is fastened to the back support bracket 122, and the back support bracket 122 is detachably firmly fixed to the purification case support bodies 121 via respective bolts 126*a* and 126*b*, and the second case 29 is mounted on the front surface side of the cabin 57 (operation section) via the travelling vehicle-body frame 120. Accordingly, the first case 28 is arranged horizontally (in a horizontally oriented posture) with respect to the front-and-back direction on the upper surface side of the diesel engine 1, while the second case 29 is positioned in a longitudinal posture on the right side of the rear portion of the diesel engine 1.

Additionally, the urea mixing pipe 39 is arranged parallel to the first case 28. The first case 28 and the urea mixing pipe 39 are supported at a high position with respect to the cooling air path of the cooling fan 24 on the upper surface of the diesel engine 1. Urea water supplied in the urea mixing pipe 39 is prevented from being crystallized due to the reduction of the temperature of the exhaust gas in the urea mixing pipe 39. Also, it is configured such that the urea water supplied in the urea mixing pipe 39 is mixed into the exhaust gas leading from the first case 28 to the second case 29 as ammonia.

As illustrated in FIGS. 4 to 9, with respect to the front surface of the cabin 57, a tail pipe 91 is vertically installed on the front surface of a corner section on the right side of the cabin 57, and the lower end side of the tail pipe 91 is extended to the lower end side of the second case 29, and the lower end side of the tail pipe 91 is connected to the SCR outlet pipe 37 on the lower end side of the second case 29, and the exhaust gas purified in the second case 29 is discharged from the tail pipe 91 to the upward direction of the cabin 57. Also, with respect to the front surface of the cabin 57, a urea water tank 71 is installed on the left side portion of the hood 56 on the side opposite to the right side portion where the tail pipe 91 is arranged. That is, the tail pipe 91 is arranged at the right side portion of the rear portion of hood 56, and the urea water tank 71 is arranged at the left side portion of the rear portion of the hood 56.

Furthermore, the urea water tank 71 is mounted on the travelling vehicle body 52 (the travelling vehicle-body frame 120 by which the cabin 57 is supported) of the rear portion on the left side of the hood 56. An oil-feeding port 46 of the fuel tank 45 and a water-feeding port 72 of the urea water tank 71 are adjacently provided on the front-surface lower portion on the left side of the cabin 57. The tail pipe 91 is arranged on the front surface on the right side of the cabin 57, on which the operator is less likely to get on/off, while the oil-feeding port 46 and the water-feeding port 72 are arranged on the front surface on the left side of the cabin 57, on which the operator is more likely to get on/off. It is noted that the cabin 57 is configured in such a manner that the operator can take or leave the maneuvering seat 58 from any of the right side or the left side.

Also, a urea water injection pump 73 that pressure-feeds the urea aqueous solution in the urea water tank 71, an electric motor 74 that drives the urea water injection pump 73, and a urea water injection nozzle 76 that connects the urea water injection pump 73 via a urea water injection pipe 75 are included. The urea water injection nozzle 76 is mounted on the urea mixing pipe 39 via an injection pedestal 77, and the urea aqueous solution is sprayed from the urea water injection nozzle 76 into the interior of the urea mixing pipe 39.

With the aforementioned constitution, carbon monoxide (CO) or hydrocarbon (HC) in the exhaust gas from the diesel engine 1 is reduced by the oxidation catalyst 30 and the soot filter 31 in the first case 28. Subsequently, the urea water from the urea water injection nozzle 76 is mixed with the exhaust gas from the diesel engine 1 in the interior of the urea mixing pipe 39. Then, the nitrogen oxides (NOx) in the exhaust gas mixed with the urea water as ammonia is reduced by the SCR catalyst 32 and the oxidation catalyst 33 in the second case 29 and discharged from tail pipe 91 to the outside.

Figure 10:
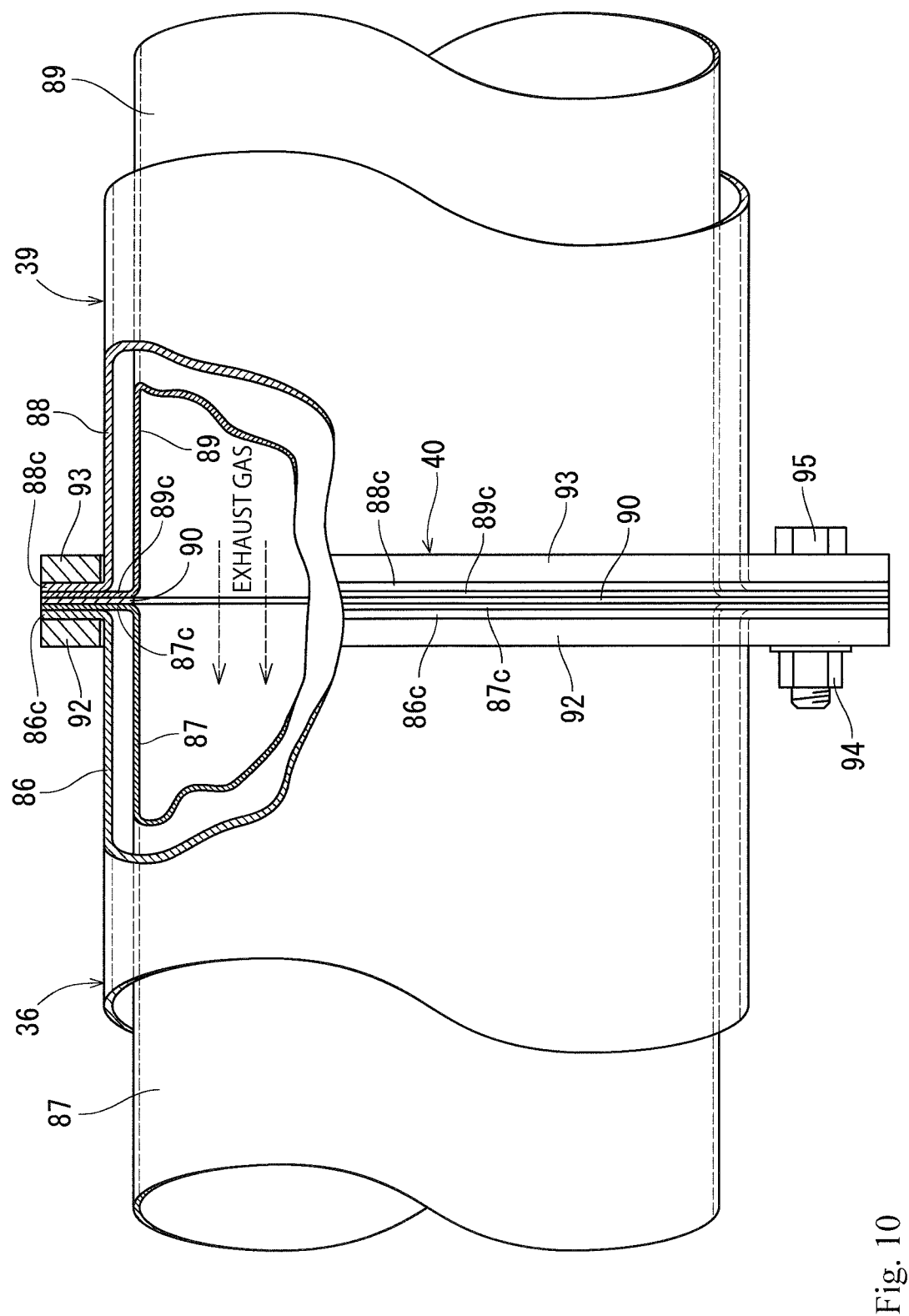
FIG. 10 is an enlarged view of a coupling section between an SCR inlet pipe and a urea mixing pipe.

Subsequently, as illustrated in FIG. 10, the pipe bracket 40 that connects the SCR inlet pipe 36 with the urea mixing pipe 39 includes an inlet-side flange body 92 arranged on the exhaust gas inlet side of the SCR inlet pipe 36 and an outlet-side flange body 93 arranged on the exhaust gas outlet side of the urea mixing pipe 39. The exhaust-gas inlet-side end portions of an outer pipe 86 and an inner pipe 87 of the SCR inlet pipe 36 having double-pipe structure are bent outward, thereby forming ring-shaped clamping piece portions 86*c* and 87*c* at the exhaust-gas inlet-side end portions of the outer pipe 86 and the inner pipe 87, and similarly, the exhaust-gas outlet-side end portions of an outer pipe 88 and an inner pipe 89 of the urea mixing pipe 39 having double-pipe structure are bent outward, thereby forming ring-shaped clamping piece portions 88*c* and 89*c* at the exhaust-gas outlet-side end portions of the outer pipe 88 and the inner pipe 89.

Each of the clamping piece portions 86c, 87c, 88c, and 89c and a gasket 90 are sandwiched with the inlet-side flange body 92 and the outlet-side flange body 93, and the inlet-side flange body 92 and the outlet-side flange body 93 are fastened and fixed with a nut 95 and a bolt 94, and each of the clamping piece portions 86c, 87c, 88c, and 89c and the gasket 90 are sandwiched and fixed between the inlet-side flange body 92 and the outlet-side flange body 93, and the SCR inlet pipe 36 and the urea mixing pipe 39 are coupled. It is noted that the outer pipe 86 of the SCR inlet pipe 36 and the outer pipe 88 of the urea mixing pipe 39 are formed with pipes having the same diameter, and the inner pipe 87 of the SCR inlet pipe 36 and the inner pipe 89 of the urea mixing pipe 39 are also formed with pipes having the same diameter. The thicknesses of the inner pipes 87 and 89 are thinly formed, compared with the thicknesses of the outer pipes 86 and 88.

That is, the exhaust gas in the urea mixing pipe 39 is configured to transfer to the SCR inlet pipe 36 without being in contact with the inner hole surface of the inlet-side flange body 92 or the outlet-side flange body 93. For example, when the exhaust gas comes into contact with the inner hole surface of the inlet-side flange body 92 or the outlet-side flange body 93, which is easily cooled, the temperature of the exhaust gas is reduced, and a urea component in the exhaust gas is crystallized and adhered to the inner hole surface of the inlet-side flange body 92 or the outlet-side flange body 93, and a mass of crystal of the urea component is formed on the inner hole surface of the inlet-side flange body 92 or the outlet-side flange body 93, and it is more likely that there occurs a malfunction that causes the hindrance of the transfer of the exhaust gas. In contrast, as illustrated in FIG. 10, the inner hole surface of the inlet-side flange body 92 or the outlet-side flange body 93 is blocked by each of the clamping piece portions 86c, 87c, 88c, and 89c, so that the exhaust gas can be prevented from being in contact with the inner hole surface of the inlet-side flange body 92 or the outlet-side flange body 93 by means of each of the clamping piece portions 87c and 89c, and a mass of crystal of the urea component can be prevented from being formed on the inner hole surface of the inlet-side flange 92 body or the outlet-side flange body 93.

Figure 11:
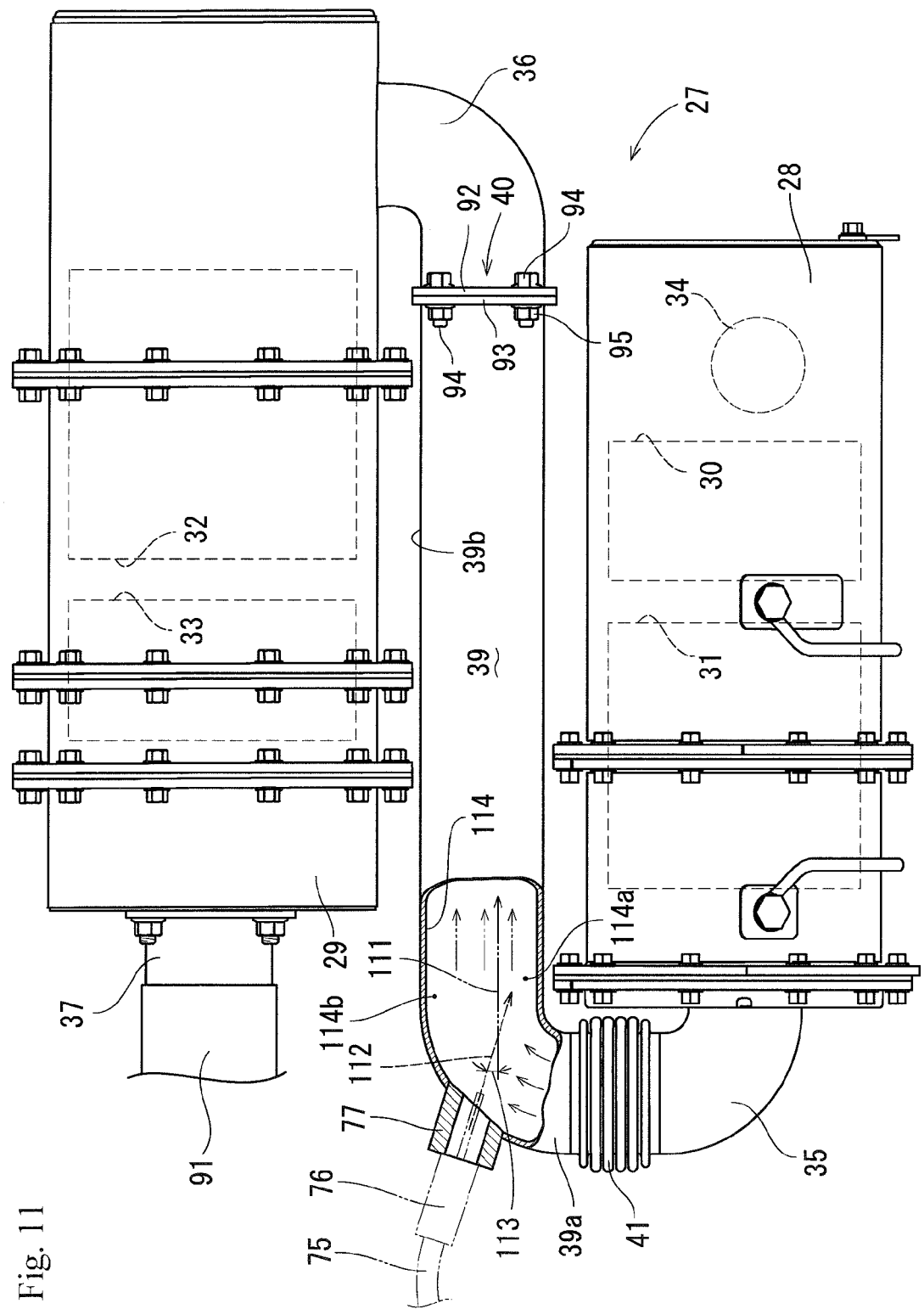
FIG. 11 is an explanatory view of an exhaust gas purification case.

Next, the structure of the urea mixing pipe 39 will be described referring to FIGS. 9 and 11. As illustrated in FIGS. 9 and 11, the urea mixing pipe 39 includes an elbow pipe portion 39a connected to the corrugated coupling pipe 41, and an oblong cylindrical straight pipe portion 39b connected to the SCR inlet pipe 36 via the pipe bracket 40. The injection pedestal 77 is welded and fixed on the elbow pipe portion 39a in the neighborhood where the elbow pipe portion 39a and the straight pipe portion 39b are joined, and the urea water injection nozzle 76 is opened from the side of the elbow pipe portion 39a to the inner hole of the straight pipe portion 39b.

Also, as illustrated in FIG. 11, the urea water injection direction 112 of the urea water injection nozzle 76 with respect to the cylindrical axial line 111 (the flow direction of the exhaust gas in the straight pipe portion 39b) of the cylindrical straight pipe portion 39b is inclined only by a predetermined inclination angle 113 (about 2 to 20 degrees, for example, 12 degrees, 8 degrees, and 4 degrees) on the downstream side of the exhaust gas of the elbow pipe portion 39a. That is, the urea water is injected from the urea water injection nozzle 76 to the side of the inner wall surface 114a on the curved inner-diameter side of the elbow pipe portion 39a, on the inner wall surface 114 of the straight pipe portion 39b. The urea water injected from the urea water injection nozzle 76 is dispersed to the side of the inner wall surface 114b on the curved outer-diameter side of the elbow pipe portion 39a, on the inner wall surface 114 of the straight pipe portion 39b, by means of the discharge pressure of the exhaust gas that transfers from the elbow pipe portion 39a to the straight pipe portion 39b, and mixed into the exhaust gas as ammonia.

It is noted that the inclination angle 113 (urea water injection direction 112) of the urea water injection nozzle 76 with respect to the cylindrical axial line 111 of the straight pipe portion 39b is determined based on the inner diameters of the elbow pipe portion 39a and the straight pipe portion 39b or the flow rate of the exhaust gas at standard operations (an operation with the rated rotation of the diesel engine 1) and the like. For example, when the inclination angle 113 is excessively wide, the urea water is adhered to the inner wall surface 114a on the curved inner-diameter side of the elbow pipe portion 39a, which causes a malfunction that the urea is likely to crystallize in the section of the inner wall surface 114a on the curved inner-diameter side. Also, when the inclination angle 113 is excessively narrow, the urea water is adhered to the inner wall surface 114b of the curved outer-diameter side of the elbow pipe portion 39a, which causes a malfunction that the urea is likely to crystallize in the section of the inner wall surface 114b of the curved outer-diameter side.

As illustrated in FIGS. 1 to 9, regarding the engine device in which the diesel engine 1 is mounted on the travelling vehicle-body frame 120, to which the right and left front wheels 53 and the right and left rear wheels 54 are arranged, the engine device for work vehicles includes the first case 28 that removes the particulate matter in the exhaust gas of the diesel engine 1, and the second case 29 that removes the nitrogen oxides in the exhaust gas of the diesel engine 1, and the engine device has the structure of supporting the first case 28 on the diesel engine 1 (or the travelling vehicle-body frame 120) wherein the second case 29 is mounted on the travelling vehicle-body frame 120 via the support bodies 121. Accordingly, it is not necessary to secure an installation space for the second case 29 in the engine room (hood 56), so that the hood 56 (engine room), in which the diesel engine 1 is internally disposed, can be configured to be compact, and the second case 29 can be easily supported on the travelling vehicle-body frame 120, thereby improving the assembly workability and the maintenance workability of the aforementioned cases 28 and 29 of which the external shape is formed an oblong, cylindrical shape. Also, the reduction in temperature of the second case 29 by means of the cooling air of the engine 1 can be restrained while the exhaust gas outlet of the first case 28 and the exhaust gas inlet of the second case 29 can be separated from each other at an interval required for mixing the urea, and the generation of ammonia in the exhaust gas leading to the second case 29 can be facilitated. It is noted that, in FIGS. 1 to 9, the first case 28 is supported on the diesel engine 1, but needless to say, the first case 28 may be supported on the travelling vehicle-body frame 120.

As illustrated in FIGS. 1 to 9, the second case 29 is mounted on the travelling vehicle-body frame 120 on one side of the rear portion of the diesel engine 1 in a longitudinal posture via the purification case support bodies 121. Accordingly, the second case 29 whose external shape is formed an oblong, cylindrical shape can be installed in a limited space in the vicinity of the rear portion of the diesel engine 1 (in the vicinity of the joint corner of the cabin 57 as the operation section and the hood 56). For example, even with the structure in which the front wheels need to be visually ensured, and therefore the right-and-left width of the hood 56 is limited, an operator's field of vision in front of the cabin 57 (operation section) can be easily secured.

As illustrated in FIGS. 1 to 9, regarding the work vehicle in which the cabin 57 as the operation section that the operator gets on is arranged on the rear of the hood 56 in which the diesel engine 1 is internally disposed, the urea water tank 71 for the exhaust gas purification is installed between the fuel tank 45 provided in the lower portion of the cabin 57 and the diesel engine 1, and the second case 29 is arranged on the one side of the rear portion of the diesel engine 1, and the urea water tank 71 is arranged on the other side of the rear portion of the diesel engine 1. Accordingly, the oil-feeding port 46 (oil-supplying port) of the fuel tank 45 and the water-feeding port 72 (water-supplying port) of the urea water tank 71 can be adjacently arranged, and the fuel-supplying operation and the water-supplying operation of the urea aqueous solution can be carried out at the same work area, and the workability of replenishing the fuel for the diesel engine 1 or the urea aqueous solution for the exhaust gas purification can be improved, while the bilateral sides (the lower portion of the front side of the cabin 57) of the rear portion of the diesel engine 1 can be effectively used as the installation space of the second case 29 and the urea water tank 71. In addition, the urea water tank 71 can be heated by the exhaust heat of the diesel engine 1 and the fuel tank 45, and the aqueous solution having a predetermined temperature or higher can be maintained in the urea water tank 71, and the reduction in the capacity of the exhaust gas purification of the second case 29 can be prevented in cold districts and the like.

Figure 12:
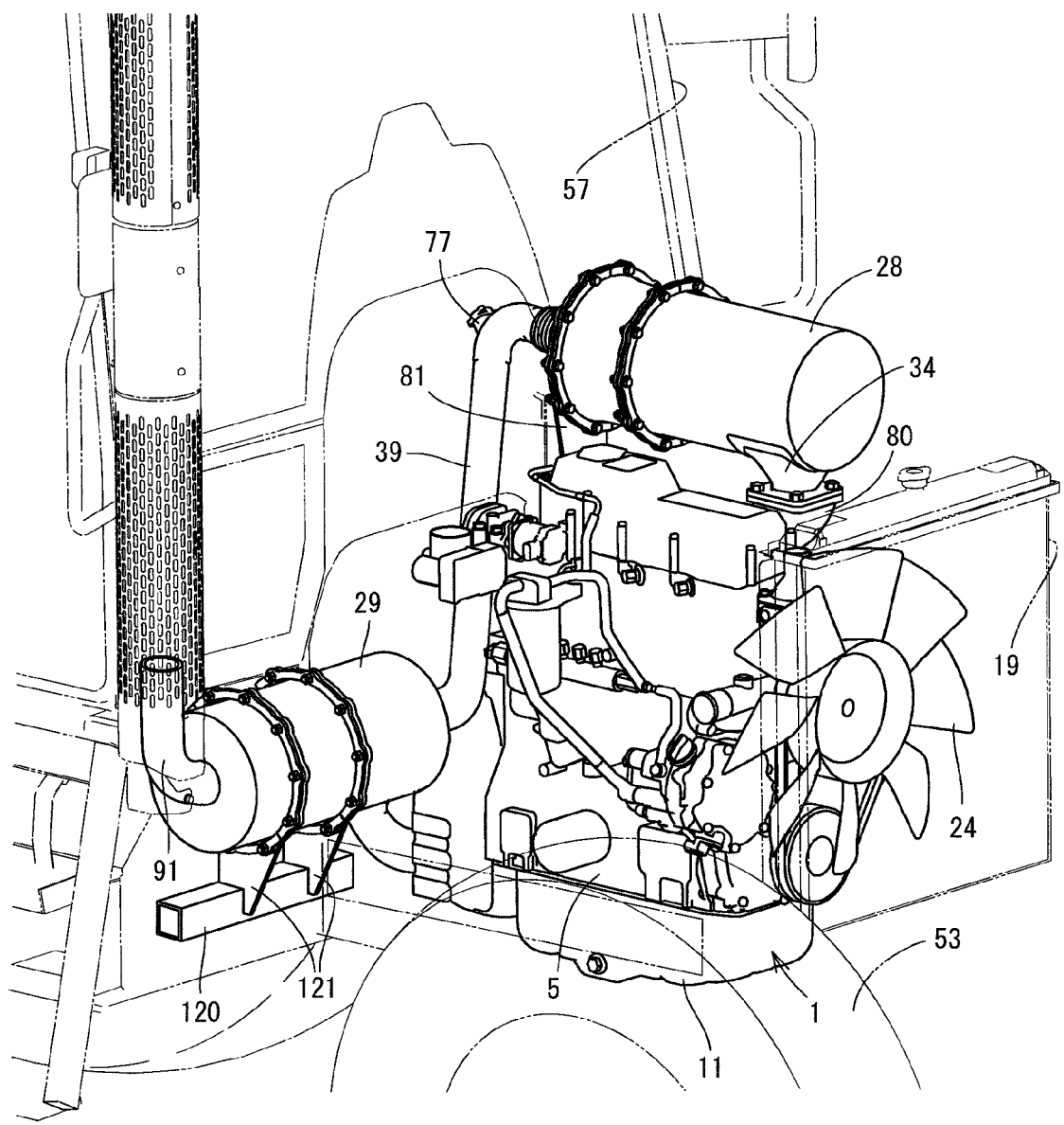
FIG. 12 is a perspective view of an engine section of the tractor that illustrates a second embodiment.

Next, the structure of arrangement of the first case 28 and the second case 29 according to a second embodiment will be described referring to FIG. 12. As illustrated in FIG. 12, the first case 28 is mounted on the upper surface side of the diesel engine 1 via the DPF support leg body 81, and the second case 29 is detachably fastened and fixed on the purification case support bodies 121 of the travelling vehicle-body frame 120 on the side where the intake manifold 3, the exhaust gas recirculation device 15, the fuel filter 44, and the like are installed, with respect to the rear side of the diesel engine 1. That is, the second case 29 is constituted in a horizontal oblong cylindrical shape elongated in the right-and-left direction. The second case 29 is mounted in a horizontally oriented posture on the travelling vehicle-body frame 120 at the lower portion on the right side of the rear portion the diesel engine 1, and the second case 29 in a horizontally oriented posture is arranged between the front surface on the right side of the cabin 57 and the right front wheel 53, and the urea mixing pipe 39 is extended to the rear portion of the diesel engine 1, and the urea mixing pipe 39 is connected to the left end side of the second case 29, and the tail pipe 91 is connected to the right end side of the second case 29.

As illustrated in FIG. 12, the second case 29 is mounted in a horizontally oriented posture on the travelling vehicle-body frame 120 on the one side of the rear portion of the diesel engine 1 via the purification case support bodies 121, so that the second case 29 whose external shape is formed in the oblong cylindrical shape can be installed in a limited space at a lower position of the rear portion of the diesel engine 1. For example, even with the structure in which the front wheels 53 need to be visually ensured, and therefore the right-and-left width of the hood 56 is limited, the second case 29 can be easily arranged at a lower position of the front surface side of the cabin 57 with respect to the outer right side of the rear portion of the hood 56, and an operator's field of vision in front of the cabin 57 can be easily secured.

Figure 13:
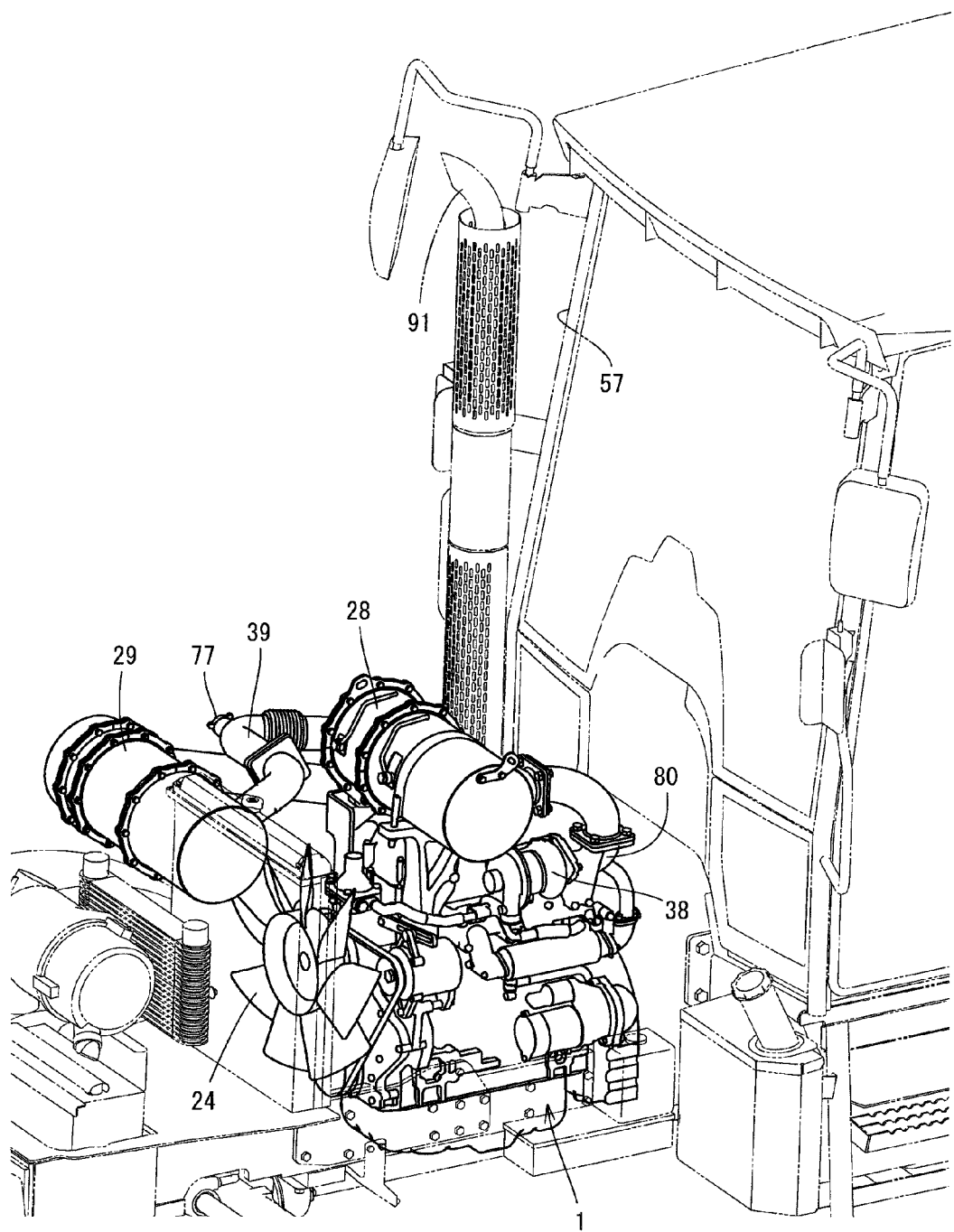
FIG. 13 is a perspective view of the engine section of the tractor that illustrates a third embodiment.

Next, the structure of arrangement of the first case 28 and the second case 29 according to a third embodiment will be described referring to FIG. 13. In third embodiment illustrated in FIG. 13, the first case 28 and the second case 29 are extended in the right-and-left direction in such a manner that the transfer direction (the cylindrical axial line) of the exhaust gas of the first case 28 and the second case 29 is orthogonal to the output shaft 4 of the diesel engine 1 that is extended in the front-and-back direction. The first case 28 and the second case 29 are arranged in parallel on the upper surface side of the installation section of the cooling fan 24, with respect to the upper surface side of the diesel engine 1, and the urea mixing pipe 39 is extended in parallel between the first case 28 and the second case 29. Also, the first case 28 and the second case 29 are disposed at a high position with respect to the air path of the cooling fan 24 of the diesel engine 1.

Figure 14:
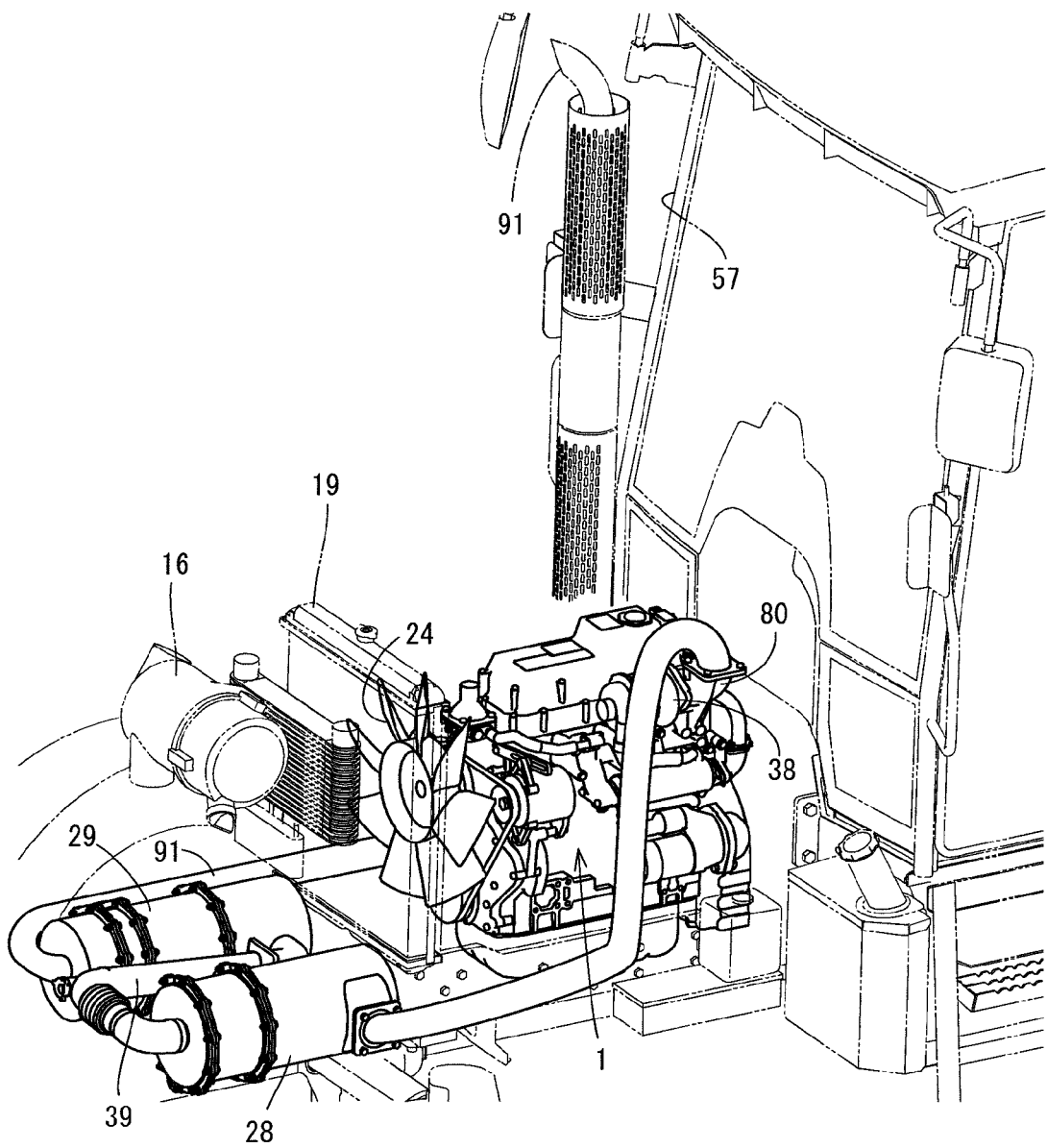
FIG. 14 is a perspective view of the engine section of the tractor that illustrates a fourth embodiment.

Next, the structure of arrangement of the first case 28 and the second case 29 of a fourth embodiment will be described referring to FIG. 14. In the fourth embodiment illustrated in FIG. 14, the first case 28 and the second case 29 are arranged in the travelling vehicle body 52 in which the air cleaner 16 is installed. The first case 28 and the second case 29 are supported by the travelling vehicle body 52 positioned forward with respect to the radiator 19. The first case 28 and the second case 29 are constituted in an oblong cylindrical shape elongated in the direction parallel to the output shaft (crankshaft) 4 of the diesel engine 1 when viewed from a plane. The urea mixing pipe 39 between the first case 28 and the second case 29 is arranged in parallel to the first case 28 and the second case 29. The second case 29 can be mounted in close proximity of the travelling vehicle body 52, and the height of the hood, which is required for the installation of the first case 28 and the second case 29, can be lowered.

REFERENCE SIGNS LIST

1 Diesel engine
28 First case
29 Second case
45 Fuel tank
53 Front wheel (running wheel)
54 Rear wheel (running wheel)
56 Hood
57 Cabin (operation section)
71 Urea water tank
120 Travelling vehicle-body frame
121 Purification case support body

The invention claimed is:
1. An engine device for a work vehicle, the engine device configured to include a first case that removes particulate matter in exhaust gas of an engine and a second case that removes nitrogen oxides in the exhaust gas of the engine, and configured to mount the engine on a travelling vehicle-body frame on which right and left running wheels are arranged, comprising:
   a structure in which the first case is supported on any of the engine or the travelling vehicle-body frame, and the second case is mounted on the travelling vehicle-body frame via support bodies, and
   wherein the work vehicle is such that an operation section that an operator gets on is arranged in a rear of a hood in which the engine is internally disposed, and wherein a urea water tank for exhaust gas purification is installed between a fuel tank provided at a lower portion of the operation section and the engine, and wherein the second case is arranged on one side of a rear portion of the engine, and the urea water tank is arranged on the other side of the rear portion of the engine.

2. The engine device for a work vehicle according to claim 1, wherein the second case is mounted in a longitudinal posture on the travelling vehicle-body frame on one side of a rear portion of the engine via the support bodies.

3. The engine device for a work vehicle according to claim 1, wherein the second case is mounted in a lateral posture on the travelling vehicle-body frame on one side of a rear portion of the engine via the support bodies.

4. An engine device for a work vehicle, the engine device configured to include a first case that removes particulate matter in exhaust gas of an engine and a second case that removes nitrogen oxides in the exhaust gas of the engine, and configured to mount the engine on a traveling vehicle-body frame on which right and left front wheels and rear wheels are arranged, wherein the work vehicle is configured with the engine and the first case internally disposed inside a hood, and an operation section that an operator gets on arranged in the rear of the hood, the first case is supported by one of either the engine or the traveling vehicle-body frame, and the second case is attached to the traveling vehicle-body frame via a support body, the second case is positioned in front of the operation section, and on one side of the engine, and in the rear of the front wheel positioned on said side, and the urea water tank is positioned in front of the operation section, and on the other side of the engine, and in the rear of the front wheel positioned on the other side.

* * * * *